United States Patent
Savalle et al.

(10) Patent No.: US 10,999,146 B1
(45) Date of Patent: May 4, 2021

(54) LEARNING WHEN TO REUSE EXISTING RULES IN ACTIVE LABELING FOR DEVICE CLASSIFICATION

(71) Applicant: Cisco Technology, Inc., San Jose, CA (US)

(72) Inventors: Pierre-André Savalle, Rueil-Malmaison (FR); Jean-Philippe Vasseur, Saint Martin D'uriage (FR); Grégory Mermoud, Veyras VS (CH); David Tedaldi, Zurich (CH); Jürg Nicolaus Diemand, Pfäffikon ZH (CH); Stéphane Bernard Martin, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/854,292

(22) Filed: Apr. 21, 2020

(51) Int. Cl.
| | |
|---|---|
| *G06F 15/16* | (2006.01) |
| *H04L 12/24* | (2006.01) |
| *G06F 16/35* | (2019.01) |
| *G06N 20/00* | (2019.01) |
| *H04L 12/26* | (2006.01) |

(52) U.S. Cl.
CPC ........ *H04L 41/0893* (2013.01); *G06F 16/353* (2019.01); *G06N 20/00* (2019.01); *H04L 41/12* (2013.01); *H04L 43/08* (2013.01)

(58) Field of Classification Search
CPC .... H04L 41/0893; H04L 41/12; G06F 16/353
USPC ........................................................ 709/224
See application file for complete search history.

(56) References Cited

U.S. PATENT DOCUMENTS

| | | | | |
|---|---|---|---|---|
| 7,698,235 | B2* | 4/2010 | Kuroiwa | G06N 20/20 706/12 |
| 9,436,919 | B2 | 9/2016 | Sun et al. | |
| 9,754,208 | B2 | 9/2017 | Xie et al. | |
| 10,164,851 | B2* | 12/2018 | Boucadair | H04L 43/12 |
| 10,389,757 | B2 | 8/2019 | Kumar et al. | |
| 10,735,285 | B2* | 8/2020 | Verma | H04L 63/1425 |
| 2003/0149604 | A1* | 8/2003 | Casati | G06Q 10/0633 705/7.22 |
| 2005/0071301 | A1* | 3/2005 | Kuroiwa | G06N 20/20 706/12 |

(Continued)

FOREIGN PATENT DOCUMENTS

WO    WO-16026509 A1    2/2016

*Primary Examiner* — Moustafa M Meky
(74) *Attorney, Agent, or Firm* — Behmke Innovation Group LLC; Kenneth J. Heywood; Jonathon P. Western

(57) ABSTRACT

In various embodiments, a device classification service forms a device cluster by applying clustering to attributes of endpoint devices observed in one or more networks. The device classification service applies an initial device classification rule to the endpoint devices in the device cluster, based on one or more of the endpoint devices in the device cluster matching the initial device classification rule. The device classification service computes metrics for the initial device classification rule that quantify how well the attributes of the endpoint devices in the device cluster match the initial device classification rule. The device classification service decides, based on the metrics, whether to associate the initial device classification rule with the device cluster or generate a new device classification rule based on the device cluster.

20 Claims, 11 Drawing Sheets

(56) References Cited

U.S. PATENT DOCUMENTS

| | | | |
|---|---|---|---|
| 2015/0295808 A1* | 10/2015 | O'Malley | H04L 47/22 709/224 |
| 2016/0323165 A1* | 11/2016 | Boucadair | H04L 45/50 |
| 2017/0147418 A1* | 5/2017 | Sasturkar | G06F 11/0751 |
| 2018/0367432 A1* | 12/2018 | Cociglio | H04L 43/026 |
| 2019/0286759 A1 | 9/2019 | Wilkins et al. | |

* cited by examiner

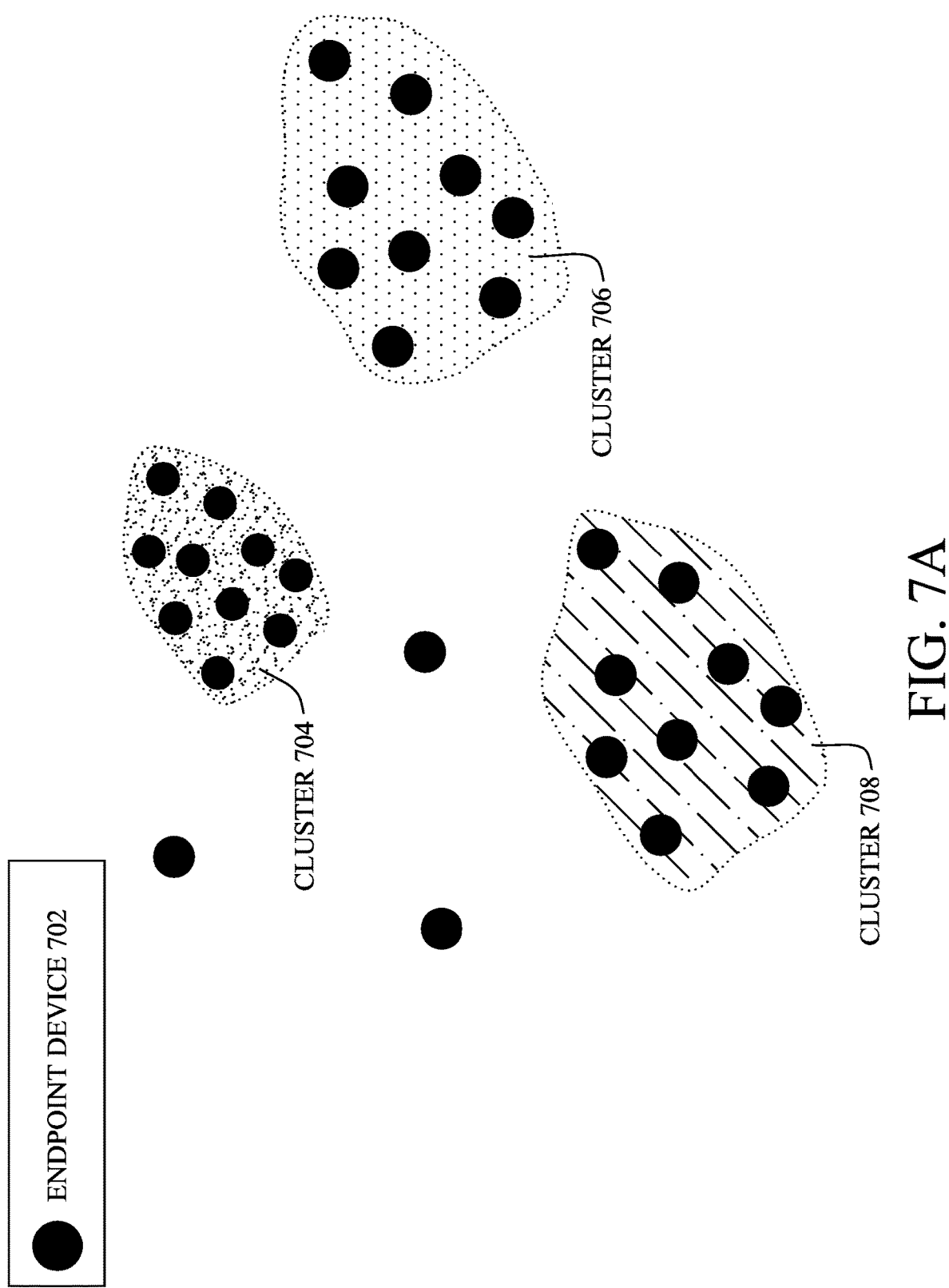

LEARNING WHEN TO REUSE EXISTING RULES IN ACTIVE LABELING FOR DEVICE CLASSIFICATION

TECHNICAL FIELD

The present disclosure relates generally to computer networks, and, more particularly, to learning when to reuse existing rules in active labeling for device classification.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute) and applying a device classification rule to the observed behavior. However, as networks change over time and/or new networks make use of the classification service, simply generating a new classification rule each time can lead to a cumbersome pool of rules that may even conflict and lead to misclassifications. Conversely, always reusing existing classification rules can also lead to poor accuracy and misclassifications, as well.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7C illustrate examples of device clusters; and

DESCRIPTION OF EXAMPLE EMBODIMENTS

Overview

Figure 1A:
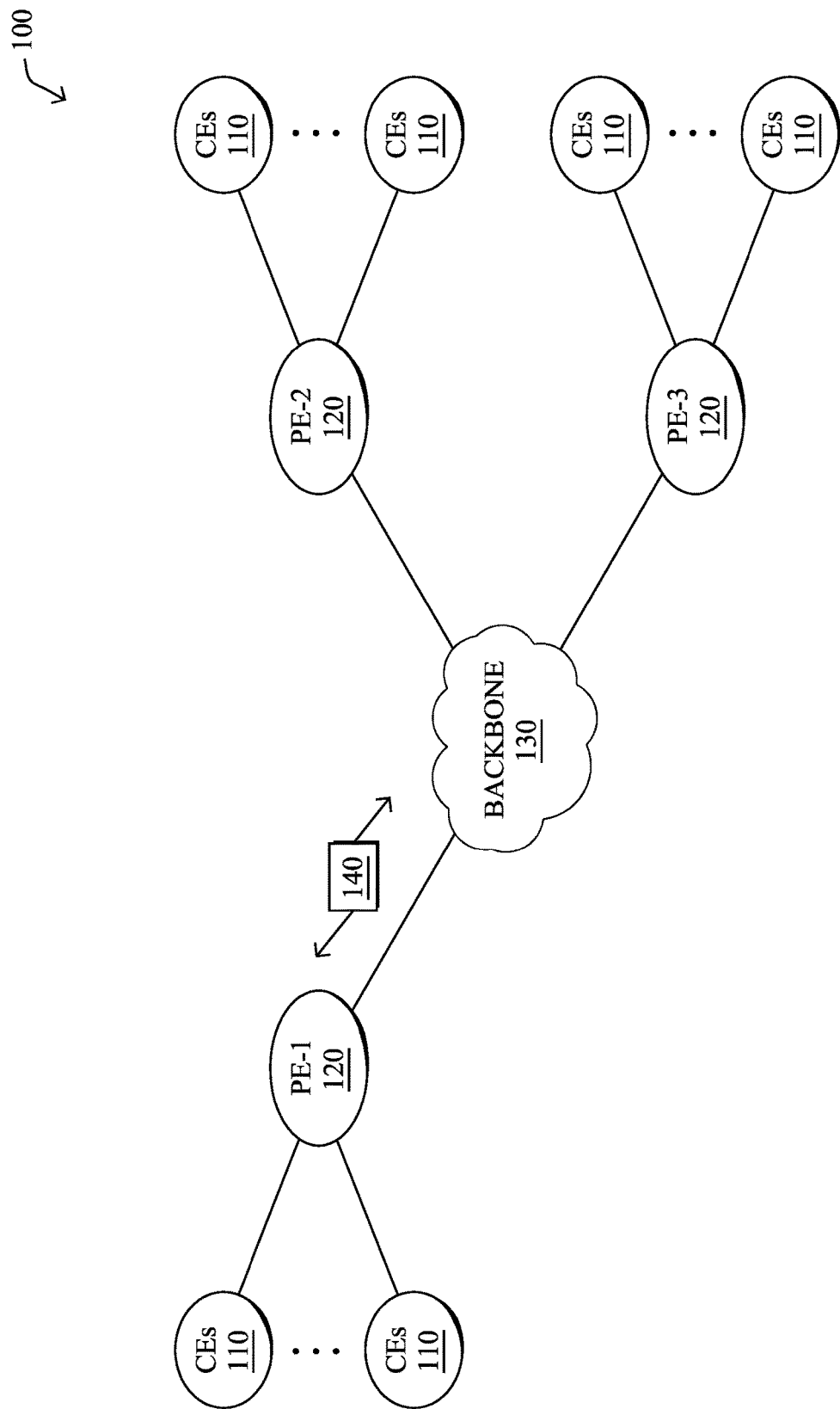
FIGS. 1A-1B illustrate an example communication network.

According to one or more embodiments of the disclosure, a device classification service forms a device cluster by applying clustering to attributes of endpoint devices observed in one or more networks. The device classification service applies an initial device classification rule to the endpoint devices in the device cluster, based on one or more of the endpoint devices in the device cluster matching the initial device classification rule. The device classification service computes metrics for the initial device classification rule that quantify how well the attributes of the endpoint devices in the device cluster match the initial device classification rule. The device classification service decides, based on the metrics, whether to associate the initial device classification rule with the device cluster or generate a new device classification rule based on the device cluster.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
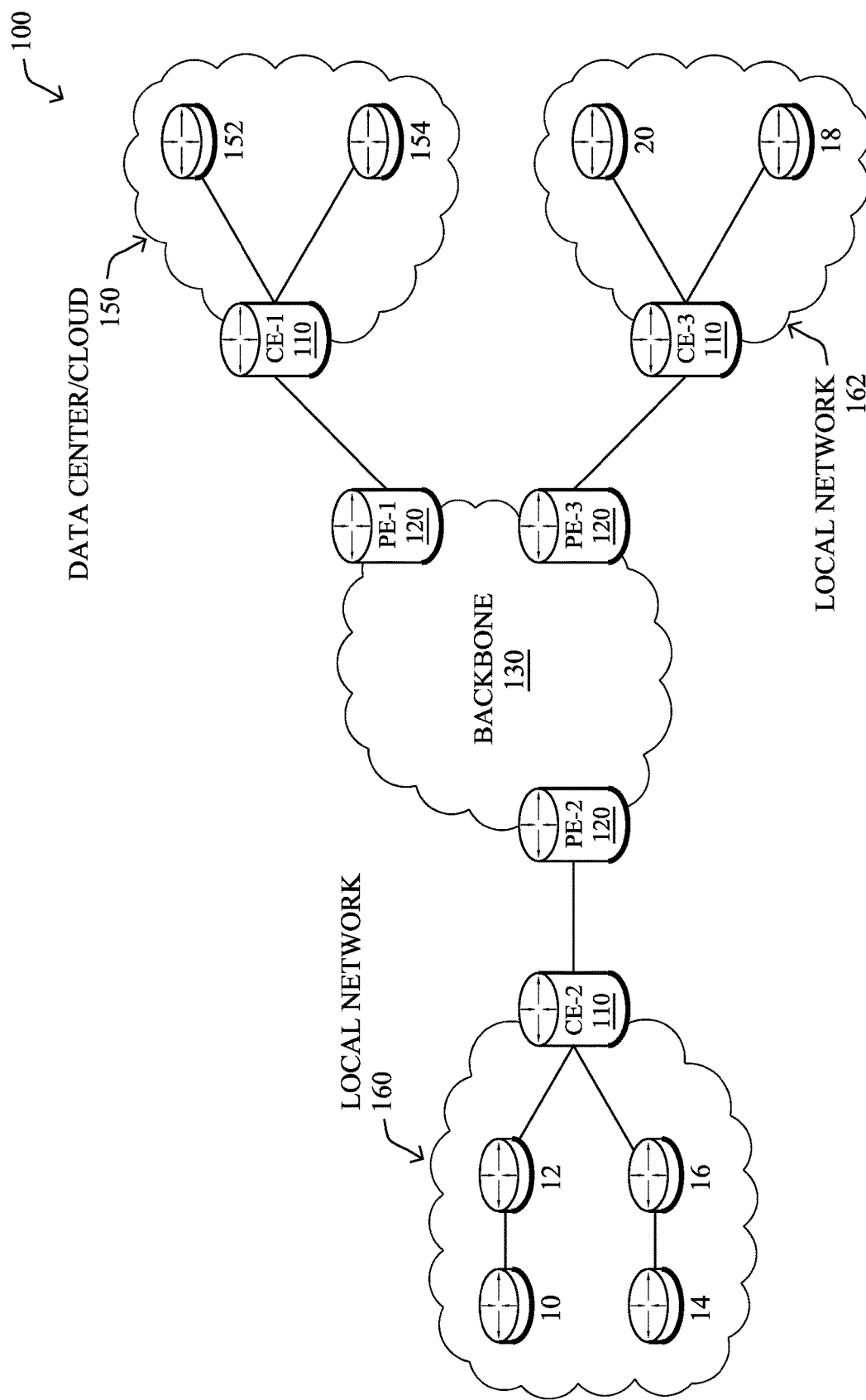

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
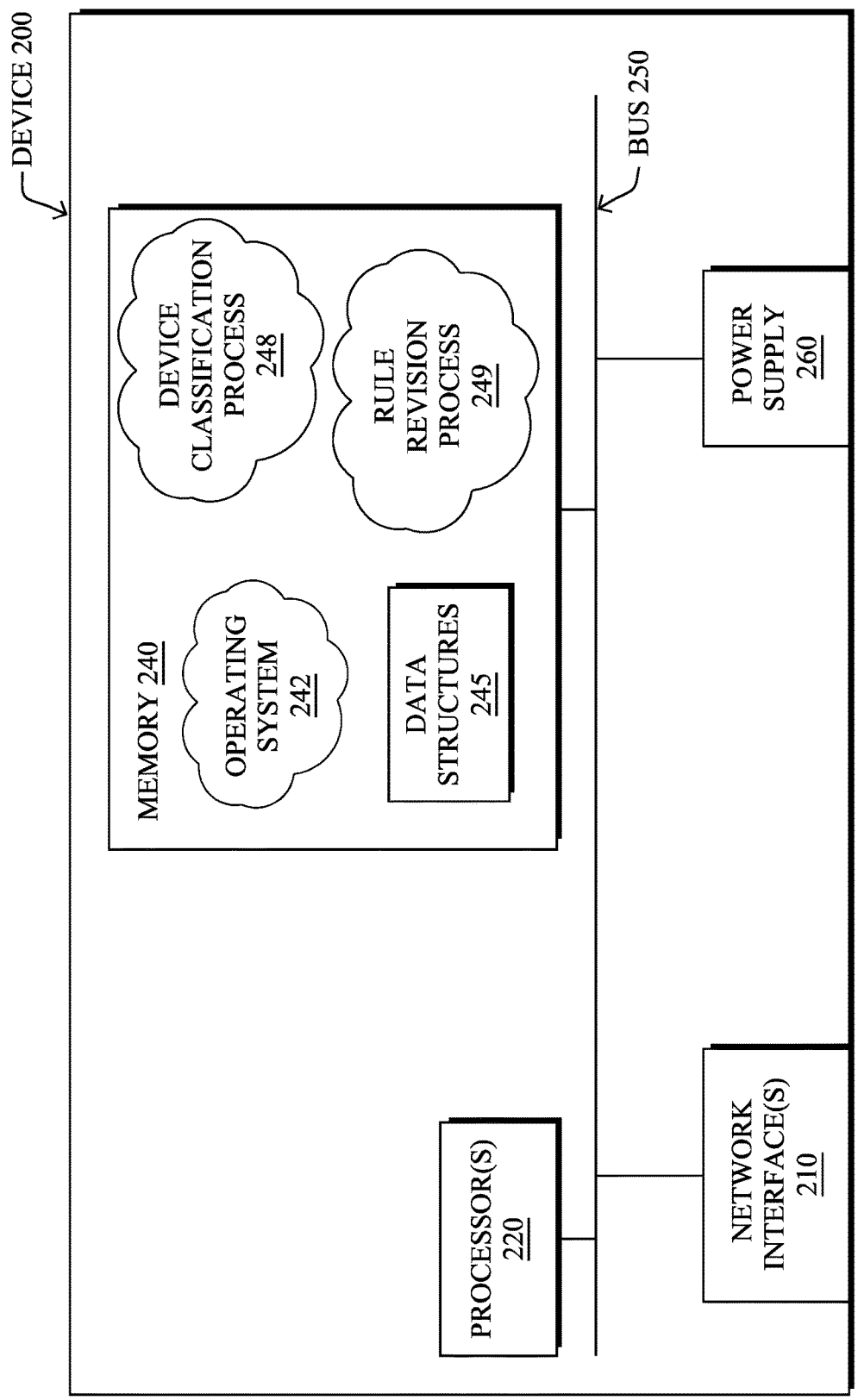
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
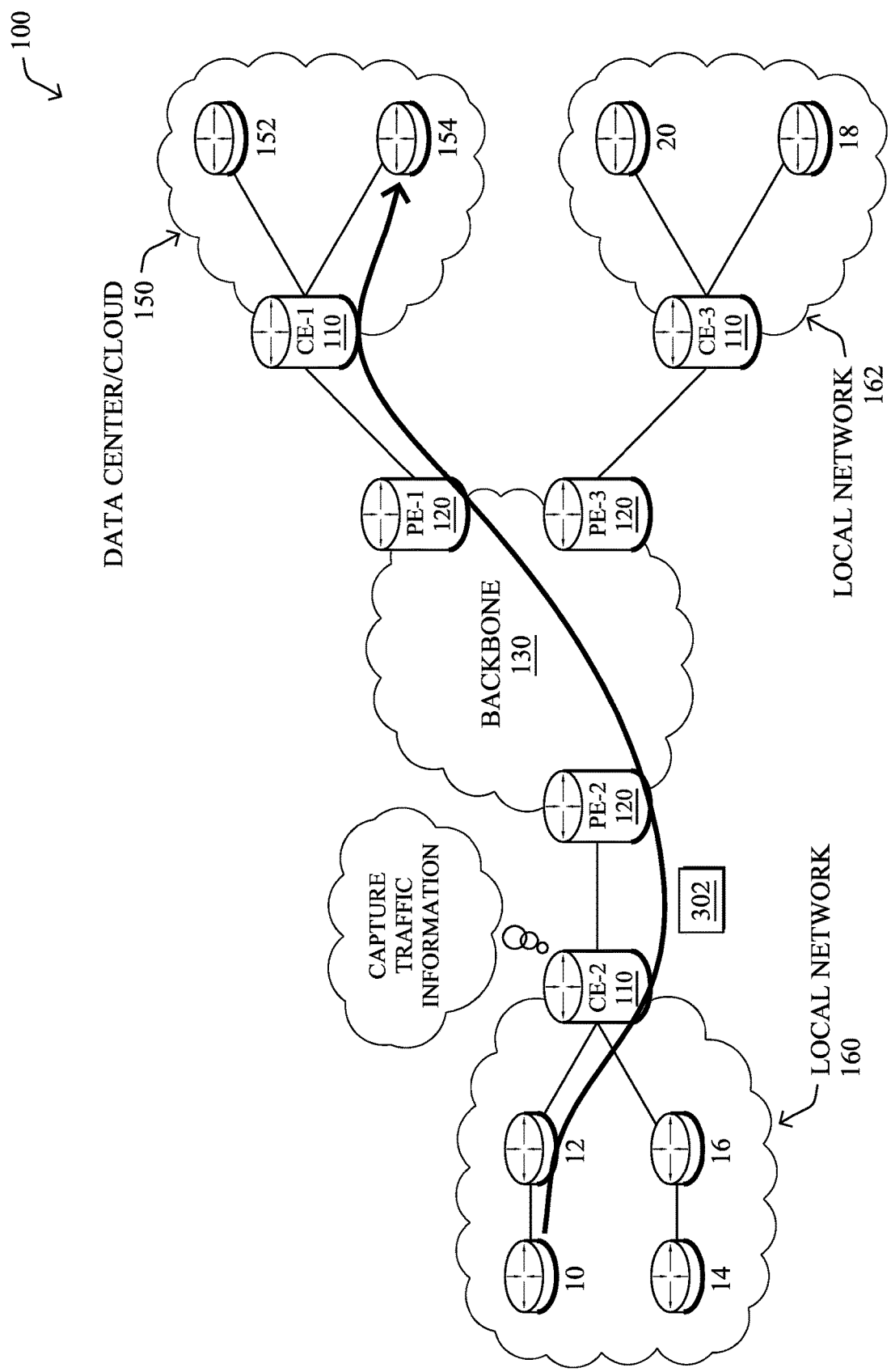
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
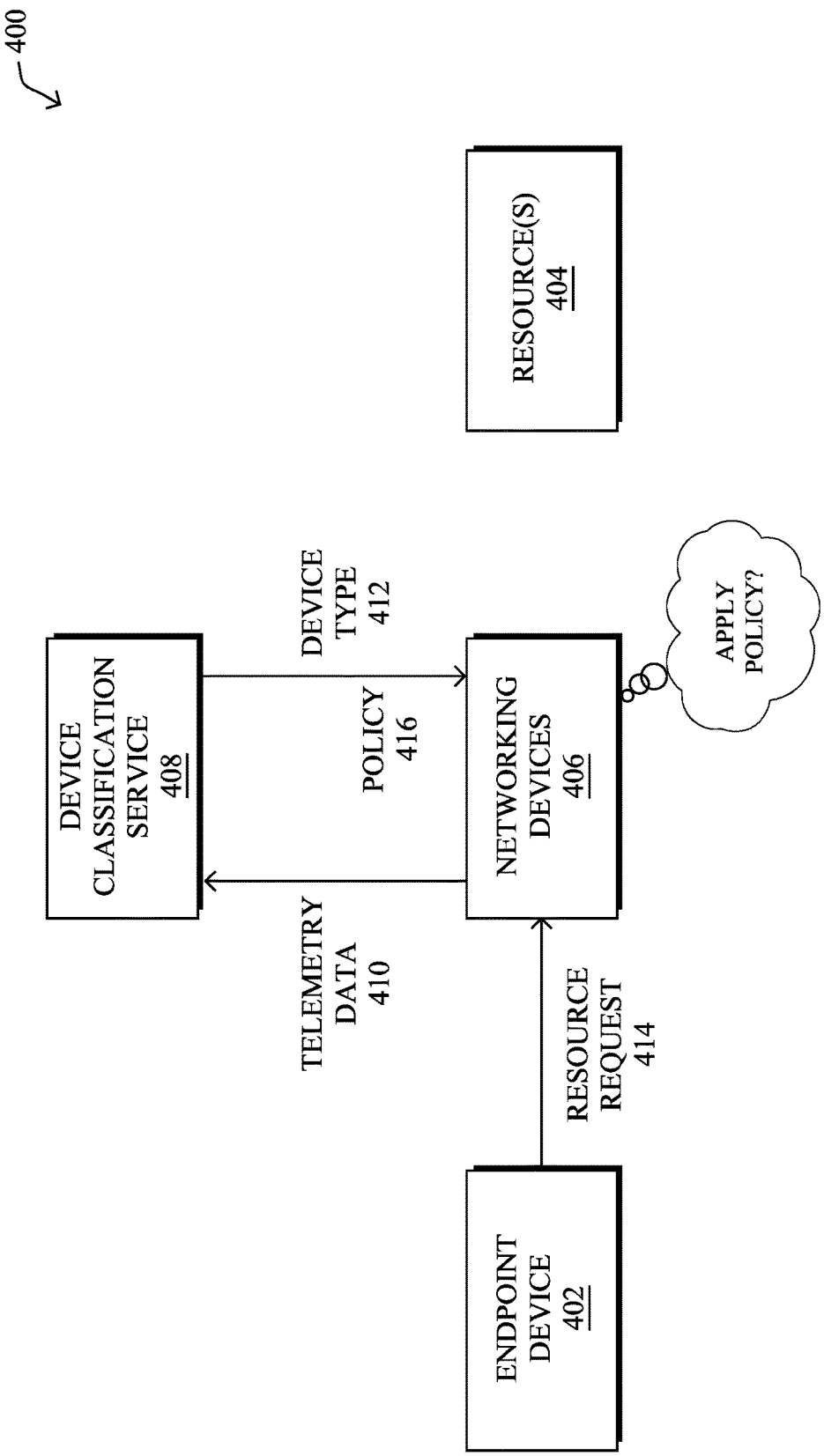
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that comprises one or more servers or other devices, such as networking devices 406, or be in communication therewith. Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
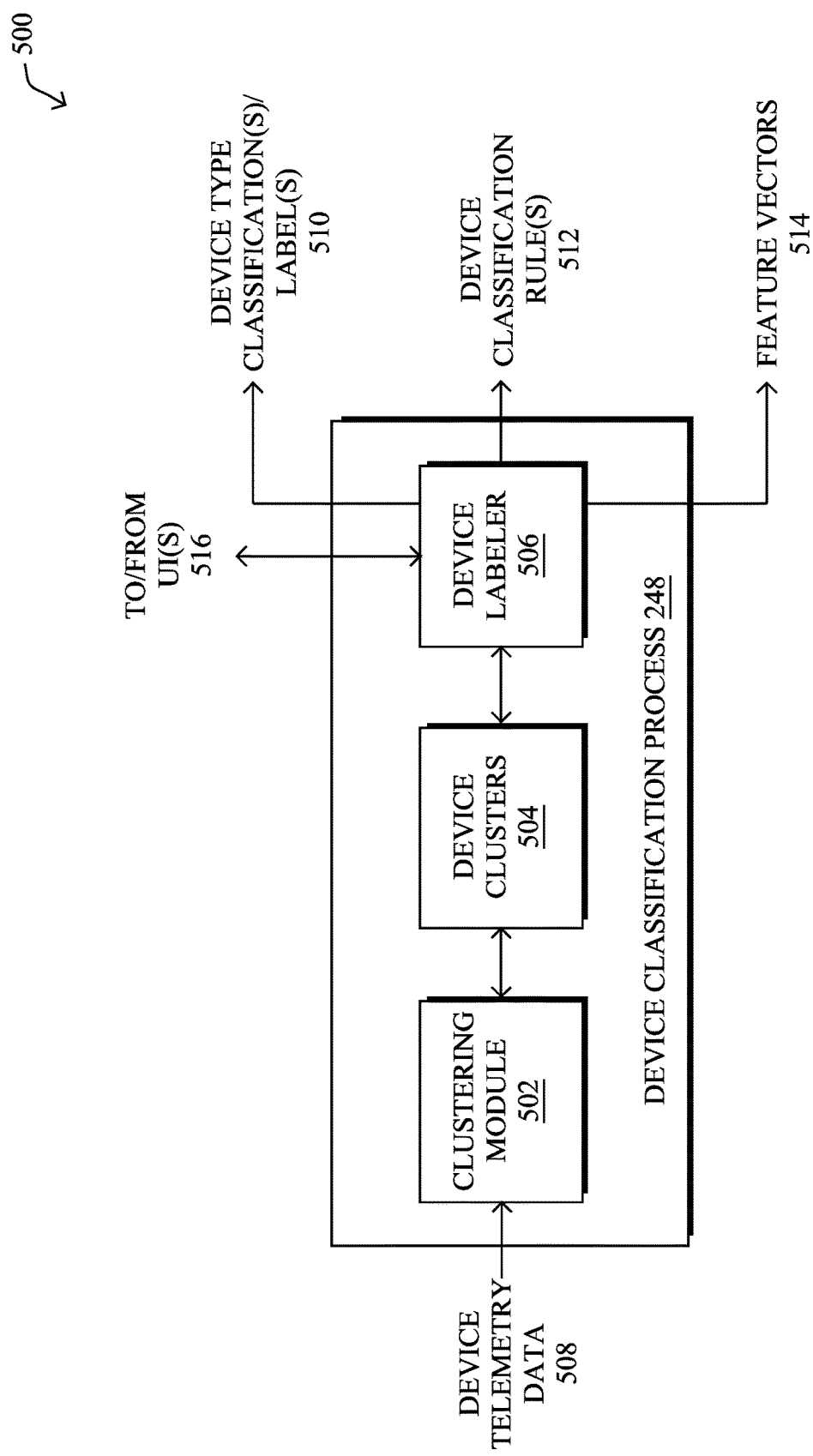
FIG. 5 illustrates an example architecture for a device classification process.

FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification/label 510 for a device under scrutiny, thereby allowing the receiving entity to apply network policies to the device, based on its device type classification(s)/label(s) 510. For example, one such network policy may cause a networking device to prevent an MRI machine from accessing the Internet or another resource via the network.

In various embodiments, the components 502-506 of device classification process 248 may leverage active learning, to assign device type classification(s)/label(s) 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification/label 510. In cases in which device labeler 506 is unable to classify the cluster 504 with sufficient confidence, it may send a label request to one or more user interfaces (UIs) 516, seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors/attributes as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification/label 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508, represented as positive and negative feature vectors 514, and the device type labels obtained from experts through active learning. For example, device labeler 506 may aggregate the labels obtained from the experts, to form a finalized device type classification label 510 for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks, etc.

For purposes of illustration, a device classification rule 512 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc. For example, the following device classification rule 512 may label an endpoint device as an "Apple iPad," if the following conditions are met:

(OUI='Apple')&&(DHCP-vendor-class-ID contains 'iPAD')

As noted above, machine learning can be used generate groups of endpoint devices (e.g., device clusters 504) and corresponding device classification rules 512 for those groups, based on the device telemetry data 508 for those devices and some user supervision via a UT 516. For each device cluster 504, a corresponding device classification rule 512 may be generated based on the attributes of the devices in that device cluster 504, to discriminate the devices in the cluster from other endpoints. The generated rules 512 then be reviewed by a user via a UI 516 and a device type label 510 associated with the rule 512, such as by having the user label the devices in the duster 504 as being of device type "x".

However, generating a new device classification rule 512 for each device cluster 504 limits the ability of the system to properly curate a good, non-conflicting set of rules 512 without many of them being near duplicates of one another. Furthermore, if a new rule 512 is specified manually by a user via 111 516, this may lead to a large number of potentially conflicting device classification rules 512, making rule maintenance highly cumbersome. In addition, if an existing device classification rule 512 already exists that discriminates a device cluster 504 of endpoint devices well from other endpoint devices, it may be preferable to use that existing rule instead of generating a new rule for that cluster, for a number of reasons. First, reusing a device classification rule 512 across multiple network deployments allows the classification service to better capture the behavior of that rule 512 in a variety of scenarios, which can be used to produce robust metrics about the rule. Second, in the long term, fewer classification rules are easier to maintain and curate. On the other hand, many classification rules that are similar or conflicting is hard to maintain, both for a single network and across multiple networks.

Various scenarios exist where it may still be preferable to generate a new device classification rule 512. For instance, this may be preferable when a new procedure for learning rules has been implemented and the existing rule may be suboptimal in some respect. It may also be preferable to generate a new device classification rule 512 when the existing rule 512 is unstable, conflicting with other rules 512, or have been poorly rated by users via UI(s) 516. As a consequence, it is important when generating device classification rules 512 for the service to be able to decide when an existing rule can (and should) be associated with a given device cluster 504, and when it would be better to generate a new device classification rule 512 for that cluster.

Learning when to Reuse Existing Rules in Active Labeling for Device Classification The techniques herein leverage a central rule database that is queried for each device cluster for existing classification rules that are already a good match to the cluster. Based on results of these queries, a new rule specific to that cluster can be trained or the existing rule can be used instead, directly. In some aspects, the decision may be based either on simple heuristics (e.g. for bootstrapping the system) by leveraging machine learning.

Specifically, according to various embodiments herein, a device classification service forms a device cluster by applying clustering to attributes of endpoint devices observed in one or more networks. The device classification service applies an initial device classification rule to the endpoint devices in the device cluster, based on one or more of the endpoint devices in the device cluster matching the initial device classification rule. The device classification service computes metrics for the initial device classification rule that quantify how well the attributes of the endpoint devices in the device cluster match the initial device classification rule. The device classification service decides, based on the metrics, whether to associate the initial device classification rule with the device cluster or generate a new device classification rule based on the device cluster.

Illustratively, the techniques described herein may be performed by hardware, software, and/or firmware, such as in accordance with device classification process 248, which may include computer executable instructions executed by the processor 220 (or independent processor of interfaces 210) to perform functions relating to the techniques described herein.

Figure 6:
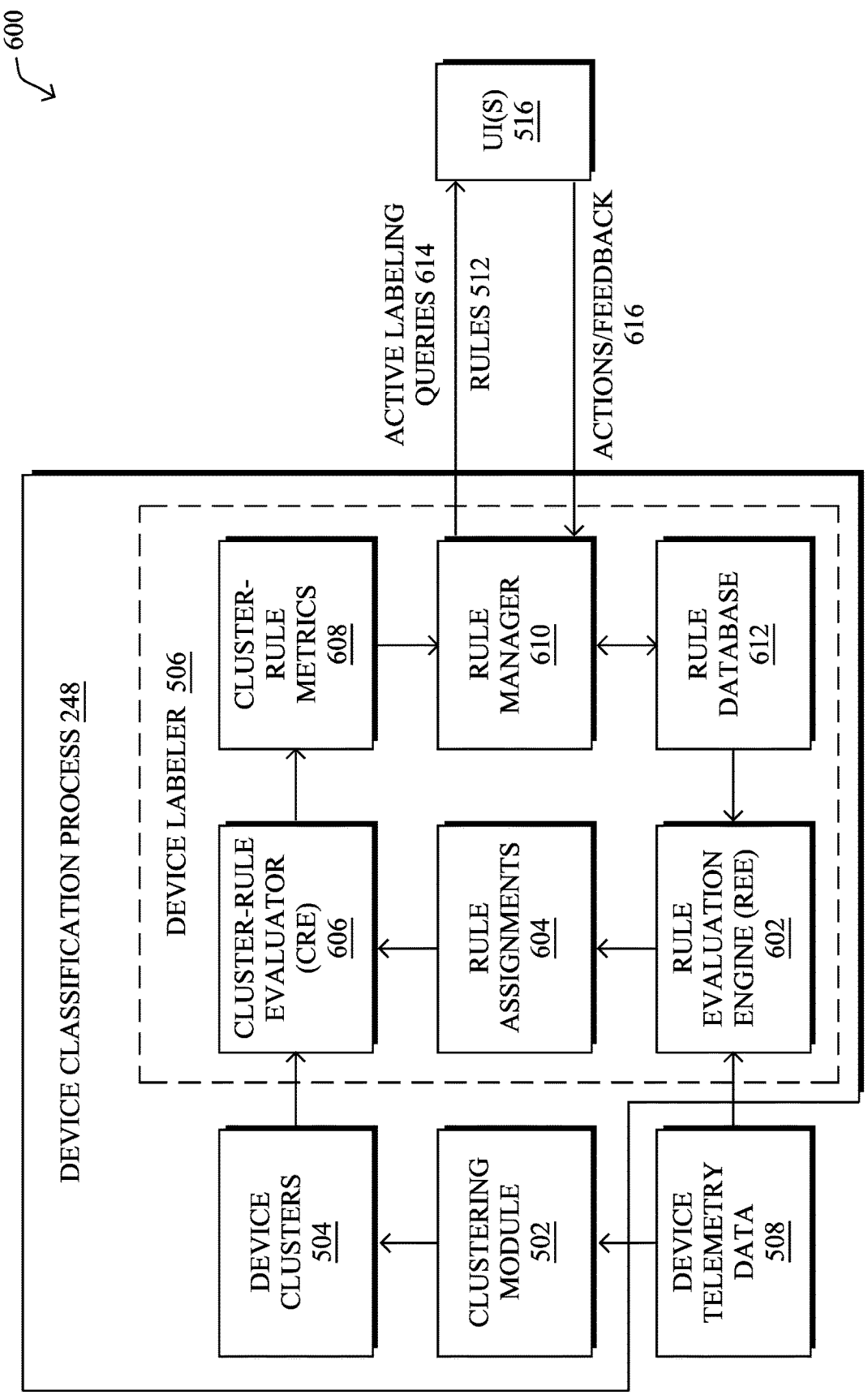
FIG. 6 illustrates an example architecture for learning when to reuse existing device classification rules.

Operationally, FIG. 6 illustrates an example architecture 600 for learning when to reuse existing device classification rules, according to various embodiments. In various embodiments, device labeler 506 of device classification process 248, described previously with respect to FIG. 5, may comprise any or all of the following components: a rule evaluation engine (REE) 602, rule assignments 604, a cluster-rule evaluator (CRE) 606, cluster-rule metrics 608, a rule manager 610, and/or a rule database 612. These components 602-612 may be implemented either on a single device or in a distributed manner, in which case the combined devices may be viewed as a singular device for purposes of implementing the techniques herein. Further, the functionalities of the components of architecture 600 may also be combined, omitted, or implemented as part of other processes, as desired.

A number of assumptions can be made with respect to the operation of architecture 600. First, it can be assumed that there exists a plurality of device classification rules 512 that have already been defined. For example, these existing rules 512 may have been generated through clustering endpoint devices and active labeling, as described previously with respect to FIG. 5, and potentially on a per-network basis. More Second, it can also be assumed that these rules 512 and their corresponding metadata are stored in a rule database 612, which may be global in that it includes rules 512 in use across any number of different networks. Whenever a new device classification rule 512 is trained and created through the active labeling operations of device classification process 248, the resulting rule and its metadata may be stored in rule database 612.

In various embodiments, rule database 612 may store any or all of the following information:

Rule definitions: the logical formulas defining the device classification rule 512 (e.g., OUI==Apple && DHCP-vendor-class-id contains iPad)

User feedback: this can be of either of the following:
  Implicit feedback: e.g., when was a given rule shown to a user?
  Explicit feedback: e.g., did the user accept or reject the rule (with reasons, ten available)?

Rule metrics: these metrics quantify the performance of the device classification rule 512, potentially on a cross-network basis. Some examples include:
  Fraction of endpoint devices matched by the rule 512.
  Fraction of endpoint devices matched by the rule 512 and at least another rule 512.
  Total number of conflicting rules (e.g., of other rules that matched at least one endpoint also matched by the rule).
  Flip-flop rate—e.g., the fraction of endpoint devices whose attributes matched the rule only a certain fraction of the time. This is indicative of some form of instability of the rule 512.
  Rule age—e.g., when was the rule 512 used for the last time and by how many devices, etc.?

As shown, device labeler 506 may also include rule evaluation engine (REE) 602, which evaluates the device classification rules 512 in rule database 612 against the various endpoint devices known to the classification service. To do so, REE 602 may compare the attributes of those devices, as indicated by their device telemetry data 508, to the rules in rule database 612. In one embodiment, REE 602 may do so in batch in parallel with clustering module 502 clustering the endpoint devices into device clusters 504, based on their attributes indicated by device telemetry data 508. In another embodiment, REE 602 may perform the rule assessments on a streaming basis as new rules 512 are generated and/or new device telemetry data 508 arrives. Although this can spread the computational load of the rule evaluation over a longer period of time, streaming evaluation is harder to implement. For instance, when a new rule 512 is added to rule database 612, it must still be evaluated against all existing endpoint devices.

Regardless of the approach taken, REE 602 evaluates the attributes of an endpoint device indicated by device telemetry data 508 against the device classification rules 512 in rule database 612. This evaluation results in rule assignments 604, which indicates the matches between the endpoint device and the device classification rule(s) 512. Indeed, a given endpoint device may be matched by multiple conflicting rules, in some cases. To speed up the rule evaluation by REE 602, it may leverage techniques such as compilation, merging all rules 512 into a single evaluation tree or other automation, or the like.

According to various embodiments, another component of architecture 600 may be cluster-rule evaluator (CRE) 606 that performs the following: for each device cluster 504 and for all of the device classification rules 512 in rule database 612 that match at least one endpoint in the device cluster, as indicated by rule assignments 604 output by REE 602, compute cluster-rule metrics 608 that quantify how well the rule matches the endpoint devices in the device cluster 504. For example, this can be quantified based on the number of endpoint devices in the device cluster 504 whose attributes matched a particular rule 512, the total number of endpoint devices in the device cluster 504, etc. In some cases, CRE 606 may represent this in the form of a confusion matrix, similar to what is done to evaluate binary classifiers, whereby the device classification rules 512 are treated as the classier and the device cluster 504 as the positive class.

In further embodiments, architecture 600 may also include rule manager 610, which decides, for each device cluster 504, whether to:
  train/generate a new device classification rule 512 from scratch, based on the attributes of the endpoint devices in the device cluster 504; or
  reuse an existing device classification rule 512 from rule database 612 for the device cluster 504.

To make this decision, rule manager 610 may leverage cluster-rule metrics 608, which indicates how well the device classification rule 512 matches the devices in the device cluster 504, feedback 616 from UI(s) 516, and/or the other metrics associated with the device classification rule 512 (e.g., its age, flip-flop rate, etc.).

In one embodiment, rule manager 610 may use a simple heuristic to select the best matching device classification rule 512, provided the metrics exceed some predefined performance threshold. For instance, if the rule matches 90% or more of the devices in the device cluster 504, rule manager 610 may simply select that existing device classification rule 512 for association with the device cluster 504.

In another embodiment, rule manager 610 may integrate its rule generation mechanisms into its decision processing. For example, for each device cluster 504, rule manager 610 may do the following:
  If there are device classification rules 512 in rule assignments 604 whose cluster-rule metrics 608 are above a threshold (e.g., its F1 score >80%), use the best of those rules 512 according to their metrics.
  If none of the device classification rules 512 have cluster-rule metrics 608 that exceed the above threshold, but still exceed a second threshold, flag them as being 'acceptable' rules (e.g., their F1 scores are between 50% and 80%). In turn, rule manager 610 may train a new device classification rule 512 and select from among the acceptable rule(s) 512 and the new rule 512, according to their respective metrics.

Otherwise, always fall back on training a new device classification rule 512.

These simple approaches can be used throughout or only during system bootstrap when machine learning techniques cannot yet be applied.

As would be appreciated, training/generation of a new device classification rule 512 may proceed according to the mechanisms described previously with respect to FIG. 5. Namely, for a given device cluster 504, rule manager 610 may extract out the attributes of the endpoint devices in a device cluster 504, to formulate a logical expression that best describes those devices. In turn, rule manager 610 may send an active labeling query 614 to UI(s) 516 that requests the user(s) to accept the resulting rule 512 and associate a device type label with the rule 512. Based on these actions/feedback 616 from UI(s) 516, rule manager 610 may associate the rule 512 with the device cluster 504 and store the rule 512 in rule database 612.

In another embodiment, rule manager 610 may decide whether to reuse an existing device classification rule 512 or generate a new rule 512 by casting the decision as a machine learning problem. To do so, rule manager 610 may leverage a machine learning classifier that treats the decision as a binary classification problem where the output classification labels correspond to "generate a new rule" or "reuse existing rule." Such a classifier may take the form of:

F:(existing rule, existing rule's performance, rule metrics, cluster-rule metrics)→{use existing rule, train new rule}

Thus, in various embodiments, the machine learning classifier may take as input any or all of the following:

The existing device classification rule 512, which may be transformed into a feature representation.

The rule metrics from rule database 612 (e.g., measuring performance of the rule 512 itself across all networks that rely on the service).

Cluster-rule metrics 608 (metrics that quantify the fit of the rule 512 to the device cluster 504).

To train the classifier, a training dataset can be built by presenting to the user(s) of UI(s) 516 both the existing device classification rule 512 and a new rule 512 for certain device clusters 504. This can be done for all device clusters 504 as part of an initial training data collection phase, and then only done on some device clusters 504 (e.g., either randomly as part of an exploration and data update strategy, or as part of some active learning procedure). In turn, the user may specify his or her rule selection, which can be used to train the classifier, accordingly.

In a simple embodiment, the classifier of rule manager 610 may capture behavior similar to the simple heuristic described above, but without having to specify a threshold a priori. In a more complex embodiment, the additional features provided to capture the existing device classification rule 512 may make the decision dynamic, based on the type of attributes used in the rule 512, in this sense learning conditional performance thresholds on the very attribute considered in each matching rule 512.

Once the classifier has been trained, it can be used by vile manager 610 to make the decision as to whether an existing device classification rule 512 should be associated with a device cluster 504 or a new rule 512 generated. Given a short list of matching rule(s) 512, based on the above heuristic of checking their F1 scores, the classifier may be applied to each of these rules 512. If any rule produces a "use existing" classification, then that rule 512 can be associated with the device cluster 504. If multiple rules produce "use existing" classifications, then the one with the highest confidence score from the classifier can be selected. Conversely, if no rule 512 produces a "use existing" classification with a high enough confidence score, then rule manager 610 may generate a new rule 512 for the device cluster 504.

Optionally, data about past decisions can also be collected and integrated to the fling dataset for the classifier of rule manager 610.

Figure 7B:
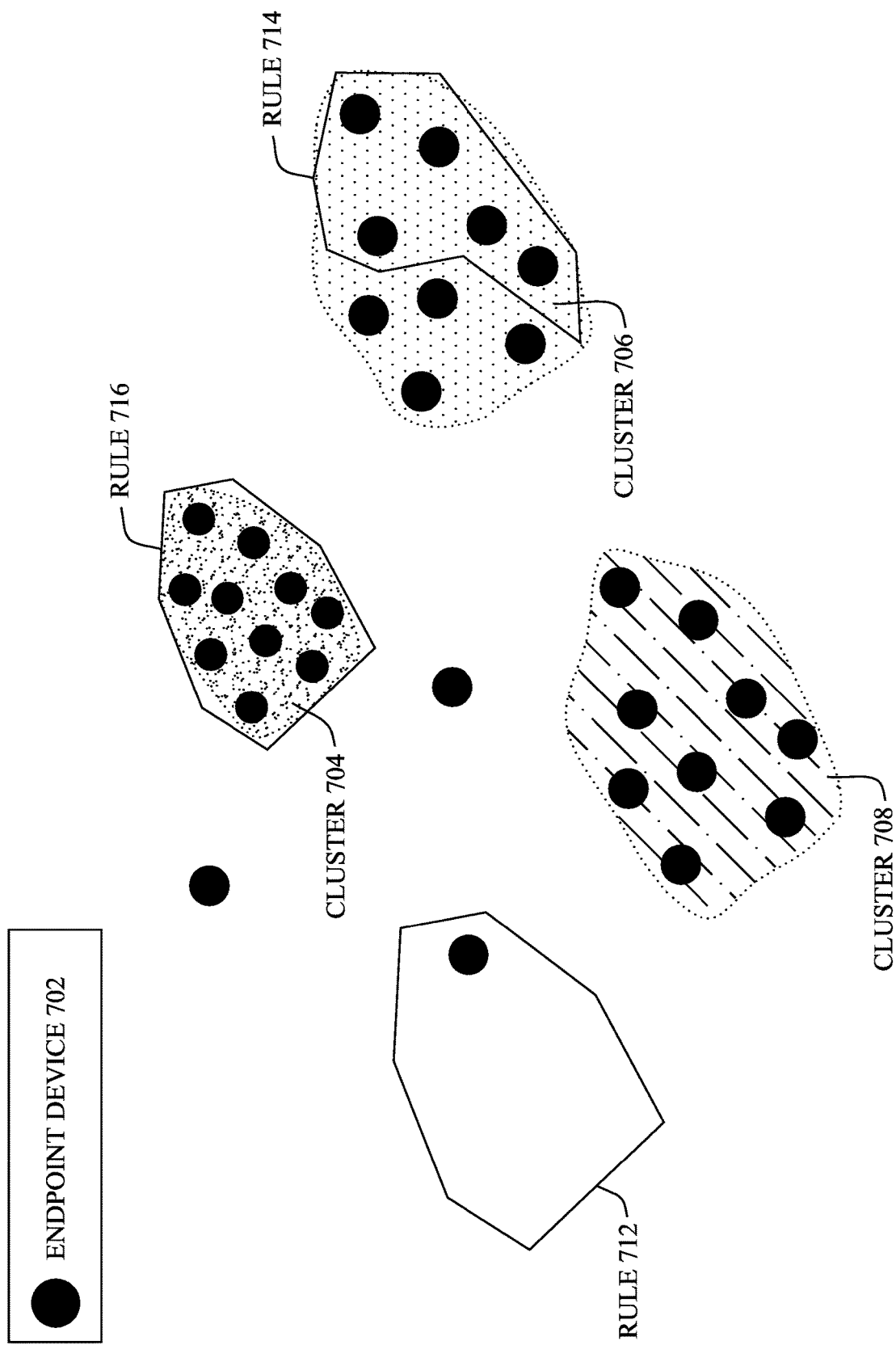
Figure 7C:
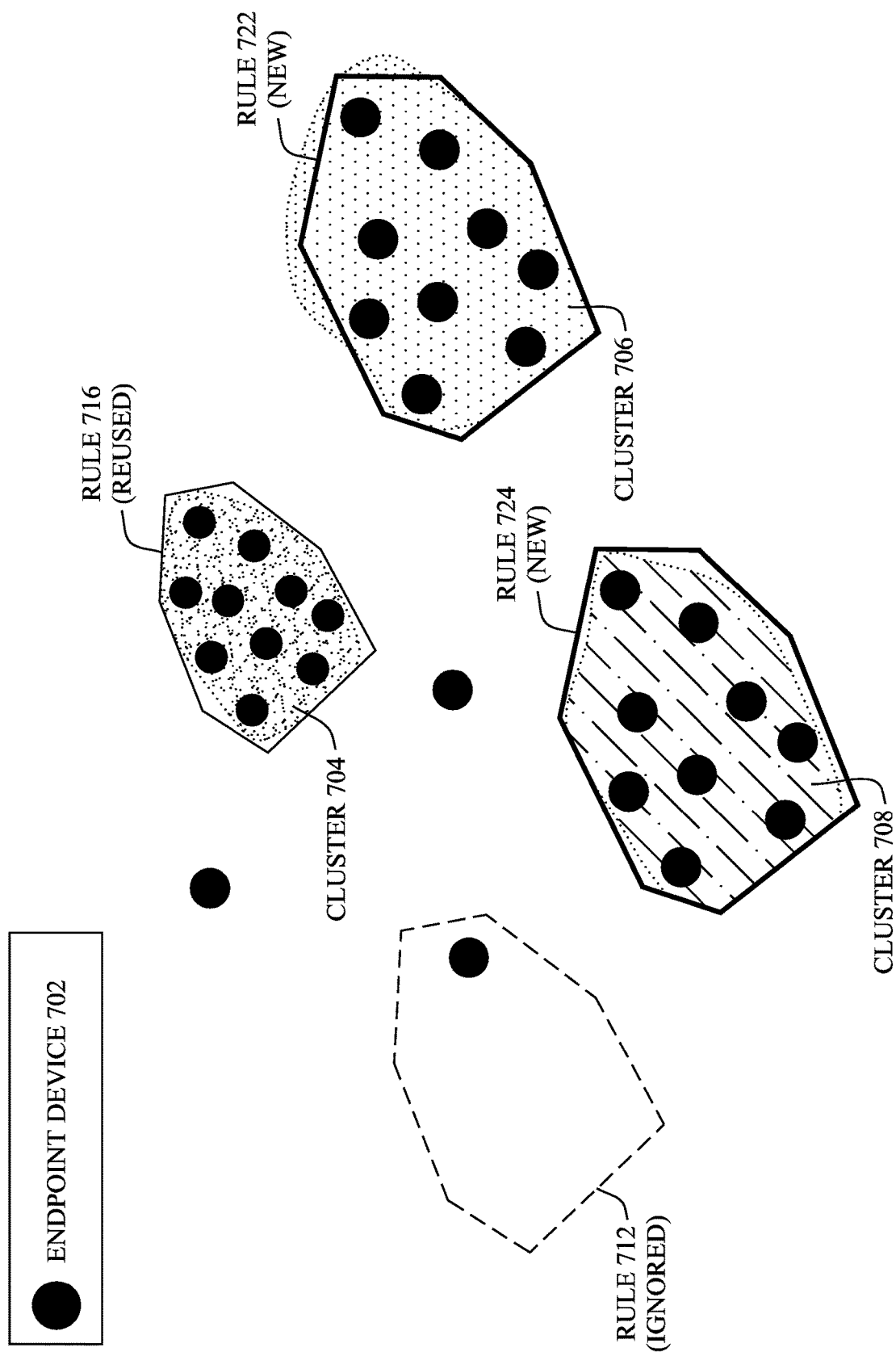

FIGS. 7A-7C illustrate examples of device clusters, according to various embodiments. As shown in FIG. 7A, assume that there are endpoint device 702 that have been clustered into device clusters 704, 706, and 708, based on their observed attributes. Note that not all endpoint devices 702 may be assigned to a device cluster and may be considered outliers.

In FIG. 7B, now assume that there are existing device classification rules, such as rules 712, 716, and 718, each matching at least one endpoint device 702 shown. Such a matching may be performed by REE 602, described previously with respect to FIG. 6. In turn, cluster-rule metrics can be computed to quantify how well the rule matches the endpoint devices 702 in a device cluster. This computation can be performed by CRE 606, described previously. For example, as shown, all of the endpoint devices 702 in cluster 704 may match rule 716, indicating a very high degree of accuracy of rule 716. In contrast, rule 714 may only match a subset of the endpoint devices 702 in cluster 706.

In FIG. 7C, a decision is made regarding each of the clusters 704-708 regarding whether to associate an existing device classification rule with that cluster or to generate a new rule, as performed by rule manager 610 described previously with respect to FIG. 6. For instance, since rule 716 very accurately matches the endpoint devices 702 in cluster 704, the decision may be to simply reuse rule 716 for cluster 704. While rule 712 does match an outlier 702, it may be ignored, since that outlier device 702 is not assigned to any device cluster.

Since no existing device classification rule matched any of the endpoint devices 702 in cluster 708, a new device classification rule 724 may be generated using the active labeling approach detailed previously.

Although device classification rule 714 did match some of the endpoint devices 702 in device cluster 706, its accuracy may not be high enough to reliably apply the rule to cluster 706. Accordingly, a new rule 722 may also be generated for cluster 706, using the active labeling approach described previously.

Figure 8:
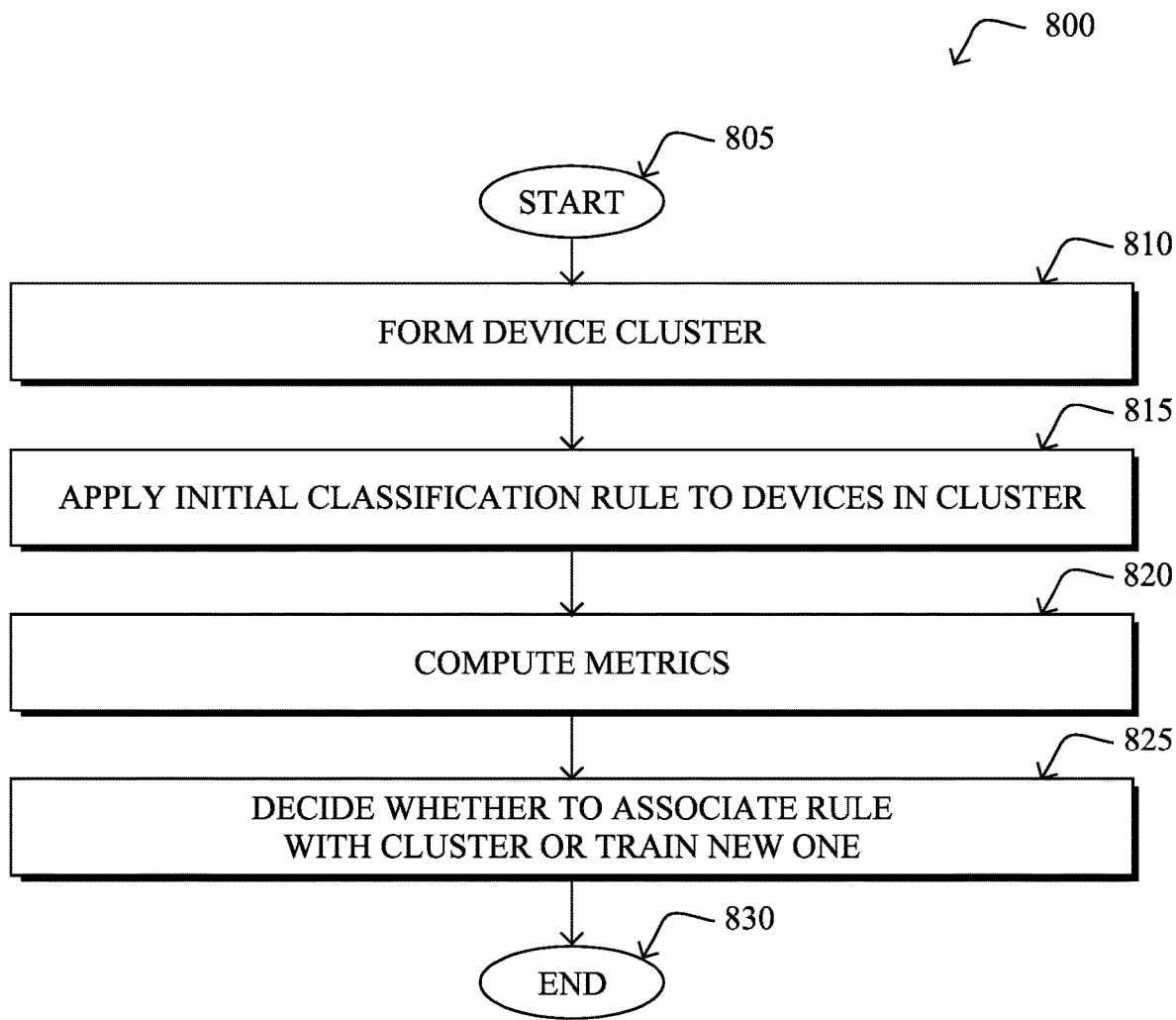
FIG. 8 illustrates an example simplified procedure learning when to reuse existing device classification rules.

FIG. 8 illustrates an example simplified procedure for adjusting a device classification rule, in accordance with one or more embodiments described herein. For example, a non-generic, specifically configured apparatus (e.g., device 200) may perform procedure 800 by executing stored instructions (e.g., device classification process 248), to provide a device classification service to one or more networks. The procedure 800 may start at step 805, and continues to step 810, where, as described in greater detail above, the device classification service forms a device cluster, by applying clustering to attributes of endpoint devices observed in one or more networks. In general, the attributes of the endpoint device may indicate their various behaviors on the network, such as, but not limited to, the various protocols that an endpoint device may use, the specific header fields that it uses (e.g., HTTP User-Agent, OUI, etc.), traffic flow information, information obtain via probing of the device, and the like.

At step 815, as detailed above, the device classification service may apply an initial device classification rule to the endpoint devices in the device cluster, based on one or more of the endpoint devices in the device cluster matching the initial device classification rule. Such a rule may be pre-existing either though manual definition by a user or by previously clustering devices by their attributes and extracting the rule from the cluster. In general, as noted, the device classification rule may comprise a logical statement of one or more device attributes and a device type label that is applied to devices whose attributes satisfy the logical statement. For example, if an endpoint device satisfies the following: (OUI='Apple') && (DHCP-vendor-class-ID contains 'iPAD'), the rule may label the device as being an "Apple iPad."

At step 820, the device classification service may compute metrics for the initial device classification rule that quantify how well the attributes of the endpoint devices in the device cluster match the initial device classification rule, as described in greater detail above. For instance, in some embodiments, the service may compute F1 scores from the application of the rule to the endpoint devices in the cluster, which measures how accurately the rule describes the various endpoints in the cluster. In various embodiments, the metrics may also include a fraction of the endpoint devices whose attributes matched the initial device classification rule, a fraction of the endpoint devices whose attributes matched the initial device classification rule and one or more other device classification rules, a flip-flop rate based on one or more of the endpoint devices only sometimes matching the initial device classification rule, a number of device classification rules that match at least one endpoint device in the device cluster, and/or an age of the initial device classification rule.

At step 825, as detailed above, the device classification service may decide, based on the metrics, whether to associate the initial device classification rule with the device cluster or generate a new device classification rule based on the device cluster. In some embodiments, the service may employ simple heuristics, to make the decision. For instance, if the F1 score for the initial device classification rule exceeds a predefined threshold, the service may simply determine that the initial device classification rule should be associated with the cluster. In turn, the rule may be used to label endpoint devices as being of a particular device type. In another embodiment, the service may flag the initial device classification rule as acceptable, based on the metrics for the initial device classification rule being between two thresholds. Then, the service may generate the new device classification rule after flagging the initial device classification rule as acceptable and decide to associate the initial device classification rule with the device cluster based on a comparison between the metrics for the initial device classification rule and metrics for the new device classification rule. In further embodiments, the service may input the metrics to a machine learning classifier trained to apply a classification label indicative of whether the initial device classification rule should be associated with the device cluster or a new device classification rule should be generated based on the device cluster. In yet another embodiment, the service may make a determination that a new device classification rule should be generated based on the device cluster, generating the new device classification rule based on the device cluster, and associating the new device classification rule with the device cluster. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a device classification service to determine whether an existing device classification rule can be reused for a particular device cluster or a new rule should be generated. For example, different attributes may become available over time due to configuration changes in the network, improvements, or when new third-party systems are integrated, leading to different device clusters. In further cases, data can be shared across different networks such that an existing rule in one network could be leveraged to help label devices in another network.

While there have been shown and described illustrative embodiments that provide for learning when to reuse existing device classification rules, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    forming, by a device classification service, a device cluster, by applying clustering to attributes of endpoint devices observed in one or more networks;
    applying, by the device classification service, an initial device classification rule to the endpoint devices in the device cluster, based on one or more of the endpoint devices in the device cluster matching the initial device classification rule;
    computing, by the device classification service, metrics for the initial device classification rule that quantify how well the attributes of the endpoint devices in the device cluster match the initial device classification rule; and
    deciding, by the device classification service and based on the metrics, whether to associate the initial device classification rule with the device cluster or generate a new device classification rule based on the device cluster.

2. The method as in claim 1, wherein the metrics comprise at least one of: a fraction of the endpoint devices whose attributes matched the initial device classification rule or a fraction of the endpoint devices whose attributes matched the initial device classification rule and one or more other device classification rules.

3. The method as in claim 1, wherein the metrics comprise at least one of: a flip-flop rate based on one or more of the endpoint devices only sometimes matching the initial device classification rule, a number of device classification rules that match at least one endpoint device in the device cluster, or an age of the initial device classification rule.

4. The method as in claim 1, wherein deciding whether to associate the initial device classification rule with the device cluster or generate a new device classification rule based on the device cluster comprises:
inputting the metrics to a machine learning classifier trained to apply a classification label indicative of whether the initial device classification rule should be associated with the device cluster or a new device classification rule should be generated based on the device cluster.

5. The method as in claim 4, wherein the machine learning classifier is trained using a training dataset by:
computing new device classification rules for a set of device clusters;
presenting existing device classification rules, the new device classification rules, and data regarding the set of device clusters to a user interface; and
receiving classification labels indicative of whether an existing device classification rule or a new device classification rule should be associated with a particular one of the set of device clusters.

6. The method as in claim 1, further comprising:
using the initial device classification rule to label endpoint devices as being of a particular device type.

7. The method as in claim 1, wherein one or more of the endpoint devices in the device cluster match a plurality of device classification rules, the method further comprising:
selecting the initial device classification rule from among the plurality of device classification rules based on the metrics for the initial device classification rule exceeding a predefined threshold.

8. The method as in claim 1, further comprising:
flagging the initial device classification rule as acceptable, based on the metrics for the initial device classification rule being between two thresholds;
generating the new device classification rule after flagging the initial device classification rule as acceptable; and
deciding to associate the initial device classification rule with the device cluster based on a comparison between the metrics for the initial device classification rule and metrics for the new device classification rule.

9. The method as in claim 1, wherein deciding whether to associate the initial device classification rule with the device cluster or generate a new device classification rule based on the device cluster comprises:
making a determination that a new device classification rule should be generated based on the device cluster;
generating a new device classification rule based on the device cluster; and
associating the new device classification rule with the device cluster.

10. An apparatus, comprising:
one or more network interfaces;
a processor coupled to the one or more network interfaces and configured to execute one or more processes; and
a memory configured to store a process that is executable by the processor, the process when executed configured to:
form a device cluster, by applying clustering to attributes of endpoint devices observed in one or more networks;
apply an initial device classification rule to the endpoint devices in the device cluster, based on one or more of the endpoint devices in the device cluster matching the initial device classification rule;
compute metrics for the initial device classification rule that quantify how well the attributes of the endpoint devices in the device cluster match the initial device classification rule; and
decide, based on the metrics, whether to associate the initial device classification rule with the device cluster or generate a new device classification rule based on the device cluster.

11. The apparatus as in claim 10, wherein the metrics comprise at least one of: a fraction of the endpoint devices whose attributes matched the initial device classification rule or a fraction of the endpoint devices whose attributes matched the initial device classification rule and one or more other device classification rules.

12. The apparatus as in claim 10, wherein the metrics comprise at least one of: a flip-flop rate based on one or more of the endpoint devices only sometimes matching the initial device classification rule, a number of device classification rules that match at least one endpoint device in the device cluster, or an age of the initial device classification rule.

13. The apparatus as in claim 10, wherein the apparatus decides whether to associate the initial device classification rule with the device cluster or generate a new device classification rule based on the device cluster by:
inputting the metrics to a machine learning classifier trained to apply a classification label indicative of whether the initial device classification rule should be associated with the device cluster or a new device classification rule should be generated based on the device cluster.

14. The apparatus as in claim 13, wherein the machine learning classifier is trained using a training dataset by:
computing new device classification rules for a set of device clusters;
presenting existing device classification rules, the new device classification rules, and data regarding the set of device clusters to a user interface; and
receiving classification labels indicative of whether an existing device classification rule or a new device classification rule should be associated with a particular one of the set of device clusters.

15. The apparatus as in claim 10, wherein the process when executed is further configured to:
use the initial device classification rule to label endpoint devices as being of a particular device type.

16. The apparatus as in claim 10, wherein one or more of the endpoint devices in the device cluster match a plurality of device classification rules, the process when executed is further configured to:
select the initial device classification rule from among the plurality of device classification rules based on the metrics for the initial device classification rule exceeding a predefined threshold.

17. The apparatus as in claim 10, wherein the process when executed is further configured to:
flag the initial device classification rule as acceptable, based on the metrics for the initial device classification rule being between two thresholds;
generate the new device classification rule after flagging the initial device classification rule as acceptable; and
decide to associate the initial device classification rule with the device cluster based on a comparison between the metrics for the initial device classification rule and metrics for the new device classification rule.

18. The apparatus as in claim 10, wherein the apparatus decides whether to associate the initial device classification rule with the device cluster or generate a new device classification rule based on the device cluster by:
   making a determination that a new device classification rule should be generated based on the device cluster;
   generating a new device classification rule based on the device cluster; and
   associating the new device classification rule with the device cluster.

19. A tangible, non-transitory, computer-readable medium storing program instructions that cause a device classification service to execute a process comprising:
   forming, by the device classification service, a device cluster, by applying clustering to attributes of endpoint devices observed in one or more networks;
   applying, by the device classification service, an initial device classification rule to the endpoint devices in the device cluster, based on one or more of the endpoint devices in the device cluster matching the initial device classification rule;
   computing, by the device classification service, metrics for the initial device classification rule that quantify how well the attributes of the endpoint devices in the device cluster match the initial device classification rule; and
   deciding, by the device classification service and based on the metrics, whether to associate the initial device classification rule with the device cluster or generate a new device classification rule based on the device cluster.

20. The computer-readable medium as in claim 19, wherein deciding whether to associate the initial device classification rule with the device cluster or generate a new device classification rule based on the device cluster comprises:
   inputting the metrics to a machine learning classifier trained to apply a classification label indicative of whether the initial device classification rule should be associated with the device cluster or a new device classification rule should be generated based on the device cluster.

\* \* \* \* \*

UNITED STATES PATENT AND TRADEMARK OFFICE
CERTIFICATE OF CORRECTION

PATENT NO. : 10,999,146 B1
APPLICATION NO. : 16/854292
DATED : May 4, 2021
INVENTOR(S) : Pierre-André Savalle et al.

It is certified that error appears in the above-identified patent and that said Letters Patent is hereby corrected as shown below:

In the Specification

Column 11, Line 53, should read:
devices and some user supervision via a UI 516. For each Column 11, Line 60, should read:
label the devices in the cluster 504 as being of device type Column 11, Line 67, should read:
user via UI 516, this may lead to a larger number of Column 12, Line 39, should read:
heuristics (e.g. for bootstrapping the system) or by leveraging Column 13, Line 36, should read:
rule (with reasons, when available)?

Column 15, Line 36, should read:
Cluster-rule metrics 608 (e.g., metrics that quantify the fit of Column 15, Line 42, should read:
504 as part of an initial training / data collection phase, and Column 15, Line 57, should read:
Once the classifier has been trained, it can be used by rule Column 16, Line 5, should read:
and integrated to the training dataset for the classifier of rule Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*